(12) United States Patent
Zhang et al.

(10) Patent No.: US 10,545,617 B2
(45) Date of Patent: Jan. 28, 2020

(54) TOUCH SCREEN AND FABRICATING METHOD THEREOF AND TOUCH DEVICE

(71) Applicants: BOE TECHNOLOGY GROUP CO., LTD., Beijing (CN); HEFEI XINSHENG OPTOELECTRONICS TECHNOLOGY CO., LTD., Hefei (CN)

(72) Inventors: Ming Zhang, Beijing (CN); Ming Hu, Beijing (CN); Xiaodong Xie, Beijing (CN); Jing Wang, Beijing (CN)

(73) Assignees: BOE TECHNOLOGY GROUP CO., LTD., Beijing (CN); HEFEI XINSHENG OPTOELECTRONICS TECHNOLOGY CO., LTD, Hefei (CN)

( * ) Notice: Subject to any disclaimer, the term of this patent is extended or adjusted under 35 U.S.C. 154(b) by 89 days.

(21) Appl. No.: 15/526,925

(22) PCT Filed: May 3, 2016

(86) PCT No.: PCT/CN2016/080901
§ 371 (c)(1),
(2) Date: May 15, 2017

(87) PCT Pub. No.: WO2017/143658
PCT Pub. Date: Aug. 31, 2017

(65) Prior Publication Data
US 2018/0107298 A1    Apr. 19, 2018

(30) Foreign Application Priority Data

Feb. 26, 2016 (CN) .......................... 2016 1 0108165

(51) Int. Cl.
*G06F 3/041* (2006.01)
*G06F 3/044* (2006.01)

(52) U.S. Cl.
CPC .... *G06F 3/044* (2013.01); *G06F 2203/04103* (2013.01); *G06F 2203/04112* (2013.01)

(58) Field of Classification Search
CPC .......... G06F 3/041; G06F 3/045; G01R 27/26
See application file for complete search history.

(56) References Cited

U.S. PATENT DOCUMENTS 9,690,434 B2 * 6/2017 Zhang ..................... G06F 3/041
2012/0280238 A1 * 11/2012 Kimura ............... H01L 27/1225
257/59

(Continued)

FOREIGN PATENT DOCUMENTS

CN 202748767 U 2/2013
CN 103164058 A 6/2013

(Continued)

OTHER PUBLICATIONS

International Search Report from PCT Application No. PCT/CN2016/080901 dated Nov. 24, 2016 (5 pages).

(Continued)

*Primary Examiner* — Pegeman Karimi
(74) *Attorney, Agent, or Firm* — Dave Law Group LLC; Raj S. Dave (57) ABSTRACT

A touch screen and a fabricating method thereof and a touch device are provided. The touch screen comprises a substrate, a touch electrode layer positioned above the substrate, and an organic insulating layer positioned beneath the touch electrode layer. At least a peripheral area of the touch electrode layer comprises a hollow area having a hollow pattern. The hollow area is at least arranged in an area where the peripheral area overlaps with the organic insulating layer. The hollow pattern allows the organic insulating layer to be partially exposed and allows the touch electrode layer to maintain electrical communication. The fabricating method of the touch screen comprises forming an organic (Continued)

insulating layer above a substrate and forming a touch electrode layer above the organic insulating layer.

17 Claims, 4 Drawing Sheets

(56) References Cited

U.S. PATENT DOCUMENTS

| | | | |
|---|---|---|---|
| 2013/0162549 A1* | 6/2013 | Kim | G06F 3/0412 |
| | | | 345/173 |
| 2013/0207911 A1 | 8/2013 | Barton et al. | |
| 2014/0340597 A1* | 11/2014 | Sato | G02F 1/13338 |
| | | | 349/12 |
| 2016/0062518 A1 | 3/2016 | Ding et al. | |
| 2016/0224142 A1* | 8/2016 | Yang | G06F 3/041 |
| 2016/0253036 A1 | 9/2016 | Yang et al. | |
| 2016/0291790 A1* | 10/2016 | Yao | G06F 3/0418 |
| 2016/0370904 A1* | 12/2016 | Wang | G06F 3/0416 |

FOREIGN PATENT DOCUMENTS

| | | |
|---|---|---|
| CN | 203134796 U | 8/2013 |
| CN | 203746036 U | 7/2014 |
| CN | 103970354 A | 8/2014 |
| CN | 104166472 A | 11/2014 |
| CN | 104216598 A | 12/2014 |
| KR | 20130072922 A | 7/2013 |

OTHER PUBLICATIONS

Written Opinion from PCT Application No. PCT/CN2016/080901 dated Nov. 24, 2016 (4 pages).
Office Action from corresponding Chinese Application No. 201610108165.X dated Feb. 9, 2018 (9 pages).

* cited by examiner

TOUCH SCREEN AND FABRICATING METHOD THEREOF AND TOUCH DEVICE

CROSS-REFERENCE TO RELATED APPLICATION

This application claims the benefit and priority of Chinese Patent Application No. 201610108165.X filed on Feb. 26, 2016, the entire content of which is incorporated herein by reference as a part of the present application.

TECHNICAL FIELD

Embodiments of the present disclosure relate to a touch screen and a fabricating method thereof and a touch device including the touch screen.

BACKGROUND

At present, touch screens are mainly divided into capacitive touch screens, resistive touch screens, infrared touch screens, acoustic touch screens and near field imaging (NFI) touch screens. Due to advantages of portability, easy accessibility and the like, touch screens have become indispensable parts of hand-held terminals such as mobile phones, tablet computers and personal digital assistants, and are increasingly used in products such as notebook computers and desktop computers. Therefore, there are demands for continuously improving the performance of the touch screen.

SUMMARY

Embodiments of the present disclosure provide a touch screen that can prevent a touch electrode from peeling off, a fabricating method thereof and a touch device including the touch screen, and thus can improve the performance and fabricating yield rate of the touch screen and the touch device.

According to a first aspect of the present disclosure, there is provided a touch screen, including: a substrate, a touch electrode layer positioned above the substrate, and an organic insulating layer positioned beneath the touch electrode layer. At least a peripheral area of the touch electrode layer includes a hollow area having a hollow pattern. The hollow area is at least arranged in an area where the peripheral area overlaps with the organic insulating layer. The hollow pattern allows the organic insulating layer to be partially exposed and allows the touch electrode layer to maintain electrical communication.

According to the above configuration, at least a peripheral area of the touch electrode layer includes a hollow area having a hollow pattern, and the hollow area is at least arranged in an area where the peripheral area overlaps with the organic insulating layer. Therefore, during a subsequent high temperature process such as baking, an exhaust channel can be set aside for gas released from the organic insulating layer in a high temperature environment, thereby preventing the touch electrode layer from peeling off due to the problem of gas release.

According to a second aspect of the present disclosure, the hollow pattern includes a plurality of mutually spaced strips; the plurality of strips extend transversely in a transversely electrically communicated area of the touch electrode layer; and the plurality of strips extend longitudinally in a longitudinally electrically communicated area of the touch electrode layer.

According to a third aspect of the present disclosure, the hollow pattern includes a mesh pattern or a dense hole pattern.

According to the above configuration, the hollow pattern may be flexibly implemented in various ways.

According to a fourth aspect of the present disclosure, the organic insulating layer includes an over coat layer.

According to a fifth aspect of the present disclosure, the organic insulating layer further includes a black matrix layer positioned on a periphery of the substrate and beneath the over coat layer.

According to the above configuration, no matter the over coat layer or the black matrix layer may, the hollow pattern can be utilized to prevent the touch electrode layer from peeling off resulted from the problem of gas release in a high temperature environment.

According to a sixth aspect of the present disclosure, only the peripheral area of the touch electrode layer includes the hollow area having the hollow pattern.

According to the above configuration, a non-peripheral area of the touch electrode layer does not include the hollow area having the hollow pattern, and remains the original sheet shape. In this way, potential electric problems such as a touch electrode pattern blanking resulted from a pattern of AA area (an effective display area, namely, an area where a display panel corresponding to the touch screen can display images) changing from a sheet shape to a strip shape may not occur, thereby guaranteeing a final product not to be affected.

According to a seventh aspect of the present disclosure, the touch screen is an OGS (One Glass Solution) touch screen.

According to the above configuration, the touch electrode layer is directly formed on the protective substrate by using OGS touch technologies. Therefore, the structural complexity and fabricating cost can be reduced for the touch screen.

According to an eighth aspect of the present disclosure, there is provided a method for fabricating the touch screen, including: forming an organic insulating layer above a substrate; and forming a touch electrode layer above the organic insulating layer. Forming a touch electrode layer includes: forming a hollow area having a hollow pattern in a peripheral area of at least the touch electrode layer, wherein the hollow pattern allows the organic insulating layer to be partially exposed and allows the touch electrode layer to maintain electrical communication. Forming a hollow area in a peripheral area of the touch electrode layer includes: forming the hollow area in an area where the peripheral area overlaps with the organic insulating layer.

According to the above configuration, the hollow area is formed at least in the peripheral area of the touch electrode layer and at least in the area where the peripheral area overlaps with the organic insulating layer. Therefore, during a subsequent high temperature process such as baking, an exhaust channel can be set aside for gas released from the organic insulating layer in a high temperature environment, thereby preventing the touch electrode layer from peeling off due to the problem of gas release.

According to a ninth aspect of the present disclosure, forming a hollow area having a hollow pattern includes: forming a plurality of mutually spaced strips extending transversely in a transversely electrically communicated area of the touch electrode layer; and forming a plurality of mutually spaced strips extending longitudinally in a longitudinally electrically communicated area of the touch electrode layer.

According to a tenth aspect of the present disclosure, forming a hollow area having a hollow pattern includes: forming the hollow area having a mesh pattern or a dense hole pattern.

According to the above configuration, the hollow pattern may be flexibly formed in various ways.

According to an eleventh aspect of the present disclosure, forming an organic insulating layer includes: forming a black matrix layer on a periphery of the substrate.

According to a twelfth aspect of the present disclosure, forming an organic insulating layer further includes: forming an over coat layer above the black matrix layer.

According to the above configuration, no matter forming the black matrix layer or the over coat layer, the hollow pattern may be utilized to prevent the touch electrode layer from peeling off resulted from the problem of gas release in a high temperature environment.

According to a thirteenth aspect of the present disclosure, forming a touch electrode layer includes: forming the hollow area having the hollow pattern only in the peripheral area of the touch electrode layer.

According to the above configuration, a non-peripheral area of the touch electrode layer is not formed with the hollow area having the hollow pattern, and remains the original sheet shape. In this way, potential electrical problems such as a touch electrode pattern blanking resulted from a pattern of AA area (an effective display area, namely, an area where a display panel corresponding to the touch screen and which can display images) changing from a sheet shape to a strip shape may not occur, thereby guaranteeing a final product not to be affected.

According to a fourteenth aspect of the present disclosure, there is provided a touch device, including the touch screen according to any one the first aspect to the seventh aspect.

According to the above configuration, a peripheral area of at least the touch electrode layer includes a hollow area having a hollow pattern, and the hollow area is at least arranged in an area where the peripheral area overlaps with the organic insulating layer. Therefore, during a subsequent high temperature process such as baking, an exhaust channel can be set aside for gas released from the organic insulating layer in a high temperature environment, thereby preventing the touch electrode layer from peeling off due to the problem of gas release.

BRIEF DESCRIPTION OF DRAWINGS

To describe technical solutions of the embodiments of the present disclosure more clearly, the following will briefly introduce the accompanying drawings of the embodiments. Apparently, schematic structural diagrams in the following accompanying drawings are not necessarily drawn to scale; instead each feature is presented in a simplified form. Furthermore, the accompanying drawings in the following description merely involve with some embodiments of the present disclosure, but not limit the present disclosure.

DETAILED DESCRIPTION

To make objectives, technical solutions, and advantages of the present disclosure clearer, the following will clearly and completely describe the technical solutions of the embodiments of the present disclosure with reference to the accompanying drawings of the embodiments of the present disclosure. Apparently, the described embodiments are some but not all of the embodiments of the present disclosure. All other embodiments obtained by those of ordinary skill in the art based on the described embodiments of the present disclosure without creative efforts shall fall within the protection scope of the present disclosure.

At present, an existing touch screen uses an organic matter as an insulating layer such as an over coat layer (OC layer) or a black matrix layer (BM layer). However, using an organic material may cause the problem of gas release in a high temperature environment, which may result in the problem that the touch electrode peels off during a subsequent high temperature process such as baking, thereby causing disconnected or short circuit of an electrical channel.

Embodiments of the present disclosure provide a touch screen and a fabricating method thereof and a touch device including the touch screen. According to the embodiments of the present disclosure, the above problems can be effectively avoided, thereby improving the performance and fabricating yield rate of the touch screen and the touch device. In the following, the touch screen and the fabricating method thereof and the touch device will be specifically described with reference to corresponding embodiments.

I. Touch Screen

Figure 1A:
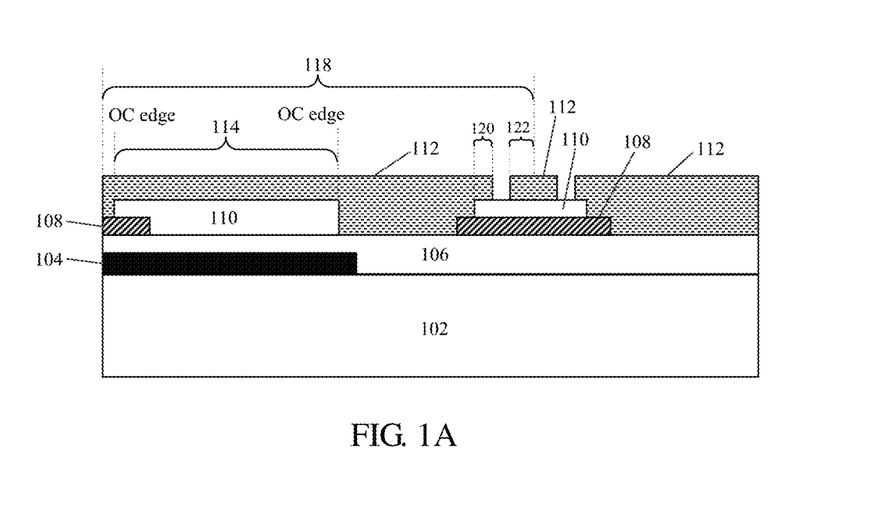
FIG. 1A and FIG. 1B are cross-sectional views of a touch screen into which the embodiments of the present disclosure may be applied.
Figure 1B:
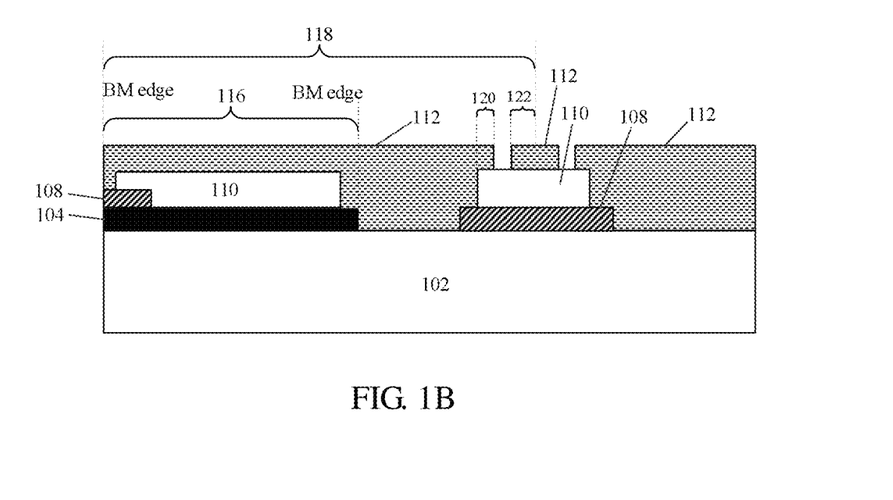

FIG. 1A and FIG. 1B are cross-sectional views of the touch screen into which the embodiments of the present disclosure may be applied. In the example as shown in FIG. 1A and FIG. 1B, the touch screen is an OGS (One Glass Solution) capacitive touch screen. The OGS touch screen refers to a technology directly forming a touch electrode layer and a sensor on a substrate, wherein the substrate plays a dual role of a protective cover plate and a touch sensor. However, it is to be noted that the example as shown in FIG. 1A and FIG. 1B is merely an illustrative example for illustrating the principle of the present disclosure. As described in detail in the following, the touch screen into which the embodiments of the present disclosure may be applied is not limited to the OGS capacitive touch screen.

As shown in FIG. 1A, the touch screen may include a substrate 102, a BM layer 104, an IM layer (index matching layer) 106, a metal layer 108, an OC layer 110 and a touch electrode layer 112. As previously mentioned, the substrate 102 plays a dual role of a protective cover plate and a touch sensor, and may be made of glass or plastics, etc. The BM layer 104 is arranged on the peripheral area of the substrate 102, mainly used for preventing light leakage and is made from an organic insulating material (for example, a resin material containing a black dye). The IM layer 106 is partially arranged on the BM layer 104 and is partially arranged on the substrate 102. The IM layer 106 is configured to reduce the visibility of an etch mark of the touch electrode layer 112 described later, and may be made from index matching materials (such as titanium dioxide and silicon dioxide). The metal layer 108 is arranged on the IM layer 106, used for electrical connection, and may be made from metallic materials (such as molybdenum or aluminum, etc.). The OC layer 110 is partially arranged on the metal layer 108, and is partially arranged on the IM layer 106. The OC layer 110 is configured to implement partial electrical insulation between the metal layer 108 and the touch electrode layer 112 described later, and is made from an organic insulating material (for example, a resin material). The touch electrode layer 112 is partially arranged on the IM layer 106, partially arranged on the metal layer 108, and partially arranged on the OC layer 110. As shown in figures, two parts, positioned at left and right sides, of the touch electrode layer 112 are electrically connected by means of a bridge formed by the metal layer 108. The touch electrode layer 112 is configured to detect a touch position by means of capacitance change when being touched by an object (for example, a finger), and may be made from a transparent electrode material (such as ITO). In the touch screen as shown in FIG. 1A, the touch electrode layer 112 at least overlaps, in an area 114 defined by two OC edges of the OC layer 110, with the OC layer 110.

The touch screen as shown in FIG. 1B is basically similar to that as shown in FIG. 1A, and the only difference resides in that the IM layer 106 is omitted in the touch screen as shown in FIG. 1B. Therefore, configurations of the substrate 102, the BM layer 104, the metal layer 108, the OC layer 110 and the touch electrode layer 112 of the touch screen as shown in FIG. 1B are not repeated any more herein. In the touch screen as shown in FIG. 1B, in an area 116 defined by two BM edges of the BM layer 104, the touch electrode layer 112 overlaps with the OC layer 110 or the BM layer 104. It is to be noted that as shown in FIG. 1B, the leftmost part of the touch electrode layer 112 does not contact the BM layer 104 because of the metal layer 108. However, because an extended length, in a direction perpendicular to paper surface of FIG. 1B, of the metal layer 108 is smaller than the length of the BM layer 104 and the touch electrode layer 112, the leftmost part of the touch electrode layer 112 still contacts, in an area where no metal layer 108 is provided, with the BM layer 104.

Figure 2:
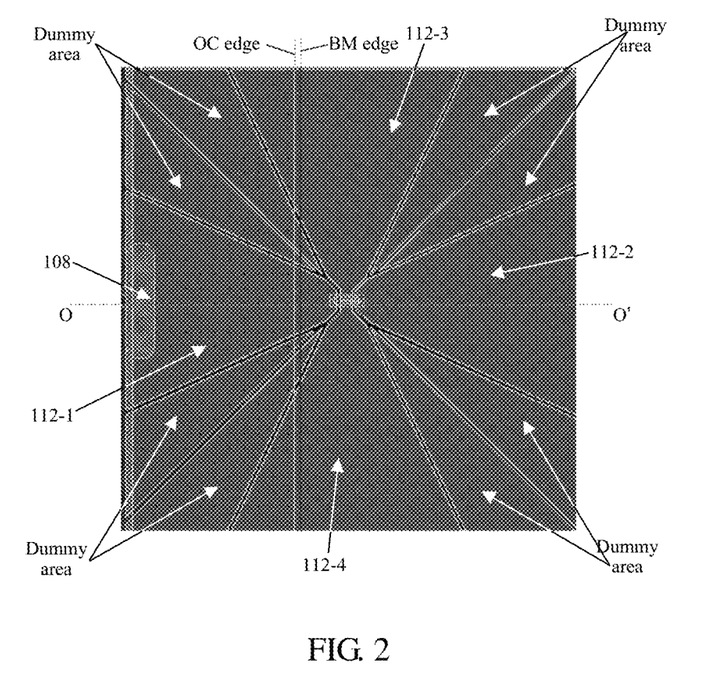
FIG. 2 is a top view of a touch electrode layer pattern in the prior art.

FIG. 2 is a vertical view of a touch electrode layer pattern in the prior art. The vertical view corresponds to the cross-section view as shown in FIG. 1A and FIG. 1B, wherein the cross-section view taken along Line O-O' of the vertical view is FIG. 1A or FIG. 1B. For brevity, FIG. 2 merely illustrates a repeating unit in the peripheral area of the touch electrode layer. The repeating unit includes: areas 112-1 and 112-2 extending transversely, which are electrically connected by means of a bridge formed by the metal layer 108, as previously mentioned; and areas 112-3 and 112-4 extending longitudinally, which are electrically communicated longitudinally. The repeating unit further includes eight dummy areas, which are used for reducing a pattern density difference and do not actually work in touch detection (that is, no electric current flows through the dummy areas).

Figure 3:
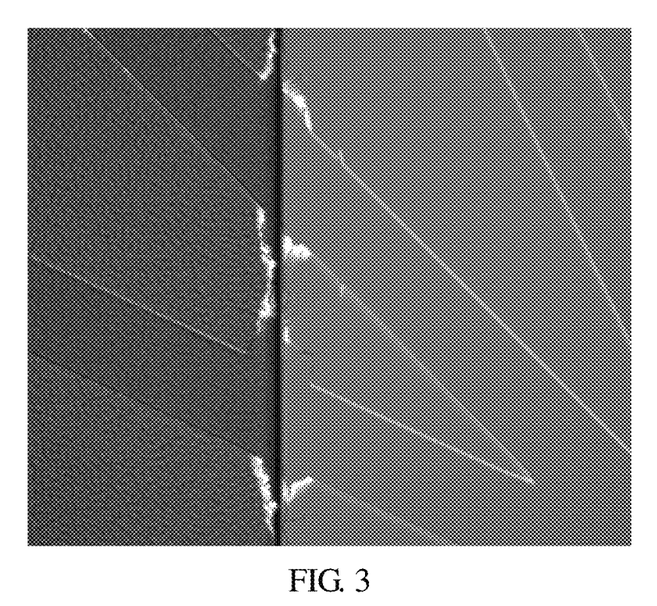
FIG. 3 is a view showing existence of the problem of peeling-off of the touch electrode layer in the prior art.

As shown in FIG. 2, an area of the existing touch electrode layer overlapping with the OC layer and/or the BM layer is covered by large sheets. However, using an organic material may cause the problem of gas release in a high temperature environment, which may result in the problem that the touch electrode peels off during a subsequent high temperature process such as baking. FIG. 3 illustrates a picture of a scanning electron microscope (SEM) having the problem of touch electrode layer peeling-off in the prior art. As shown in FIG. 3, in the existing touch screen, the touch electrode layer partially peels off. This problem may be relatively apparent when the processes are not well adjusted.

Figure 4A:
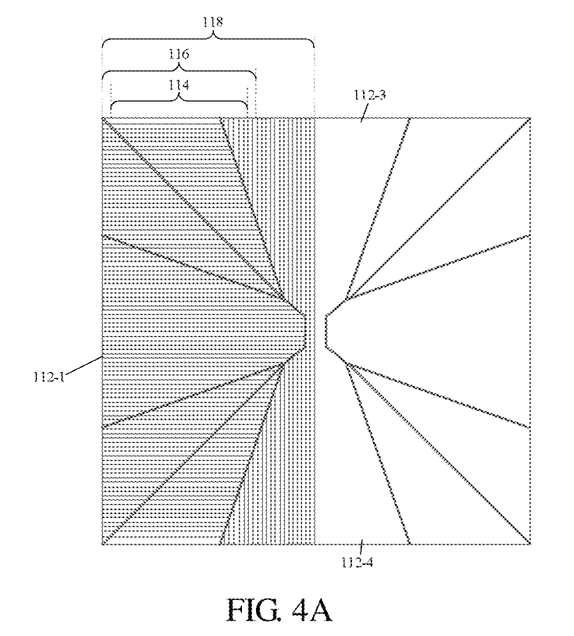
FIG. 4A and FIG. 4B are top views illustrating touch electrode layer patterns according to different embodiments of the present disclosure.
Figure 4B:
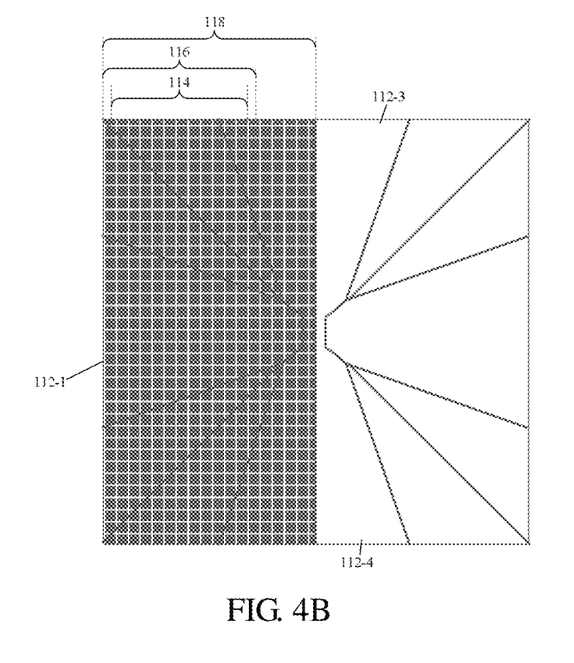

FIG. 4A and FIG. 4B are vertical views illustrating touch electrode layer patterns according to different embodiments of the present disclosure. For clarity, some parts as shown in FIG. 2 are omitted in FIG. 4A and FIG. 4B. In the example as shown in FIG. 4A, the whole peripheral area 118 of the touch electrode layer is a hollow area having a hollow pattern, one edge of the peripheral area 118 is an edge of the touch screen, and another edge is an edge obtained after the OC edge or the BM edge close to the middle part of the touch screen extends, by a certain distance (for example, 1-3 mm), toward inside of the touch screen. In the transversely electrically communicated area 112-1 of the touch electrode layer, the hollow patterns are a plurality of mutually spaced strips extending transversely. In the longitudinally electrically communicated areas 112-3 and 112-4, the hollow patterns are a plurality of mutually spaced strips extending longitudinally. In four dummy areas positioned at left side, the hollow patterns are a plurality of mutually spaced thin strips extending transversely.

It is to be noted that in FIG. 4A, dark-colored areas indicate areas where no touch electrode layer is arranged, and white-colored areas indicate areas where the touch electrode layers are arranged. That is, the hollow patterns of the touch electrode layer are represented by a plurality of mutually spaced white strips extending transversely and a plurality of mutually spaced white strips extending longitudinally, and exhaust channels mentioned in the following are represented by a plurality of mutually spaced dark-colored lines extending transversely and a plurality of mutually spaced dark-colored lines extending longitudinally.

As thus, because the hollow patterns having a plurality of mutually spaced strips are arranged, during a subsequent high temperature process such as baking, a gap between strips may serve as an exhaust channel of gas released from the OC layer or BM layer in a high temperature environment, thereby preventing the touch electrode from peeling off resulted from a large sheet of touch electrode layer covering on the organic material, and reaching the objective of improving yield rate on the basis of not increasing process difficulty. Furthermore, each strip extends transversely in a transversely electrically communicated area and extends longitudinally in a longitudinally electrically communicated area. Therefore, electrical communication of the touch electrode layer can be maintained, thereby balancing the problem of gas release and the problem of electrical communication. In addition, only the peripheral area includes the hollow area having the hollow pattern, and the touch electrode layer in a non-peripheral area is not modified. Therefore, potential electricity's problems such as a touch electrode pattern blanking out resulted from a pattern of AA area changing from a sheet shape to a thin strip shape may not occur, thereby guaranteeing a final product not to be affected.

However, the present disclosure is not limited to the example as shown in FIG. 4A. First, a scope of setting area of the hollow pattern may be changed. As another example, in the case as shown in FIG. 1A, a peripheral area 118 of the touch electrode layer may have hollow patterns only in areas (namely, areas 114, 120 and 122, wherein the area 114 is an area defined by the OC edge) overlapping with the OC layer. In the case as shown in FIG. 1B, the peripheral area 118 of the touch electrode layer may have hollow patterns only in areas (namely, areas 116, 120 and 122, wherein the area 116 is an area defined by the BM edge) overlapping with the OC layer and the BM layer. In an area contacting the metal layer 108 but not contacting the BM layer, the touch electrode layer may have or not have the hollow pattern. That is, the area where the touch electrode layer overlaps with the organic insulating layer (the OC layer or the BM layer) may merely include an area where the touch electrode layer directly overlaps with the organic insulating layer, or may not only include the area where the touch electrode layer directly overlaps with the organic insulating layer, but also include an area where the touch electrode layer indirectly overlaps with the organic insulating layer (that is, the touch electrode layer is separated from the organic insulating layer by an area where other layers such as the metal layer 108 overlap). In addition, it is to be noted that the peripheral area of the touch electrode layer is not limited to the example as described above, but may at least cover the area 114 of FIG. 1A or the area 116 of FIG. 1B. As thus, when the peripheral area of the touch electrode layer only covers the area 114 in FIG. 1A or the area 116 in FIG. 1B but does not cover the areas 120 and 122, in the case as shown in FIG. 1A, the peripheral area of the touch electrode layer may only have a hollow pattern in an area (namely, the area 114 defined by an OC edge) overlapping with an OC layer. In the case as shown in FIG. 1B, the peripheral area of the touch electrode layer may only have the hollow pattern in an area (namely, the area 116 defined by a BM edge) overlapping with the OC layer and the BM layer. Of course, the periphery of the touch screen may only have the BM layer but does not have the OC layer. In such a case, an area where the touch electrode layer is provided with the hollow pattern is the same as the area including the OC layer, which is not repeated any more.

As yet another example, the peripheral area includes the hollow area having the hollow pattern; furthermore, the non-peripheral area of the touch electrode layer further includes the hollow area having the hollow pattern. The hollow area may be at least arranged in an area (similar to an overlapping area in the peripheral area, which is not repeated any more herein) where the non-peripheral area overlaps with the organic insulating layer. That is, in an extreme case, the whole touch electrode layer may have the hollow patterns. It is to be noted that the non-peripheral area of the touch electrode layer is less affected by the problem of high temperature caused gas release of the organic insulating layer than the peripheral area of the touch electrode layer. Therefore, in the event that the non-peripheral area of the touch electrode layer also includes the hollow area, the density of the hollow pattern in the non-peripheral area may be smaller than that of the hollow pattern in the peripheral area, thereby alleviating the touch electrode pattern blanking and electricity's problem as mentioned previously.

Next, the extending direction of each strip may not be a transverse direction or a longitudinal direction strictly, and may incline, in a certain extent, to the transverse direction or the longitudinal direction. In addition, because the dummy areas do not actually work in touch detection, as yet another example, the hollow patterns in the dummy areas may also have a plurality of mutually spaced thin strips extending longitudinally. As yet another example, each of the four dummy areas at the left side may have a plurality of mutually spaced strips extending transversely or longitudinally, or does not have the hollow pattern (namely, remains the sheet shape).

An example as shown in FIG. 4B is similar to that in FIG. 4A, and the difference is that the hollow pattern in FIG. 4B is the mesh pattern. Similar to FIG. 4A, in FIG. 4B, dark-colored areas indicate areas where no touch electrode layer is arranged, and white-colored areas indicate areas where the touch electrode layers are arranged. That is, the hollow pattern of the touch electrode layer is indicated by white grid lines, and an exhaust channel is indicated by a plurality of dark squares defined by the grid lines.

As thus, because the mesh patterns are arranged, during a subsequent high temperature process such as baking, a grid of the mesh pattern may serve as an exhaust channel of gas released from the OC layer or BM layer in a high temperature environment, thereby preventing the touch electrode from peeling off resulted from a large sheet of touch electrode layer covering on the organic material, and reaching the objective of improving yield rate on the basis of not increasing process difficulty. Furthermore, because the mesh patterns are arranged, electrical communication of the touch electrode layer can be maintained, thereby balancing the problem of gas release and the problem of electrical communication. In addition, only the peripheral area includes the mesh pattern, and the touch electrode layer in a non-peripheral area is not modified. Therefore, potential electric problems such as a touch electrode pattern blanking resulted from a pattern of AA area changing from a sheet shape to a grid shape may not occur, thereby guaranteeing a final product not to be affected.

However, the present disclosure is not limited to the example as shown in FIG. 4B. First, as described for FIG. 4A, a scope of setting area of the hollow pattern may be changed, which is not repeated any more herein. Next, grids of the mesh pattern are not limited to squares, and may be rectangles, rhombus, circles, ovals, irregular shapes and the like; wherein when the grids are shaped like, for example, circles or ovals, the mesh pattern may be regarded as being equivalent to the dense hole pattern. In addition, the dummy areas do not actually work in touch detection, each of the four dummy areas at the left side may have the mesh pattern or the dense hole pattern, or does not have the hollow pattern (namely, remains the sheet shape). In addition, the hollow pattern is not limited to the above examples as long as the hollow pattern allows the organic insulating layer (for example, the OC layer or the BM layer) positioned beneath to be partially exposed and allows the touch electrode layer to maintain electrical communication.

In addition, it is to be noted that although the embodiments of the present disclosure are described in the background of the OGS capacitive touch screen hereinbefore, those skilled in the art can understand that the principle of the present disclosure may also be applied to other types of touch screens needing to arrange the touch electrode layers on the organic insulating layers.

II. A Method for Fabricating a Touch Screen

Figure 5:
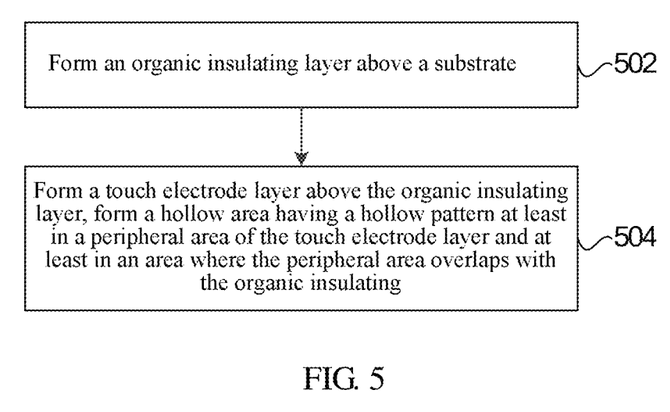
FIG. 5 is a flowchart of a fabricating method of the touch screen according to an embodiment of the present disclosure.

FIG. 5 is a flowchart of a method for fabricating the touch screen according to an embodiment of the present disclosure. In Step 502, an organic insulating layer is formed above a substrate. As an example, for the case as shown in FIG. 1B, Step 502 may include the following substeps: first, forming a BM layer in a peripheral area of the substrate. The substep may be implemented utilizing any existing technology used for forming the BM layer. For example, the BM layer may be formed in the peripheral area of the substrate by coating photoresist, carrying out exposure with a mask, developing with developing solution, etching with etching liquid and peeling off the photoresist in sequence. Later, a metal layer is formed on the BM layer. The substep may be implemented utilizing any existing technology used for forming the metal layer. For example, the metal layer may be formed above the black matrix layer by depositing, coating or sputtering. Later, an OC layer is formed on the BM layer or the metal layer. The substep may be implemented utilizing a technology similar to any existing technology used for forming the BM layer, which is not repeated any more herein.

In Step 504, forming a touch electrode layer above the organic insulating layer, wherein forming a touch electrode layer includes: forming a hollow area having a hollow pattern in a peripheral area of at least the touch electrode layer, wherein the hollow pattern allows the organic insulating layer to be partially exposed and allows the touch electrode layer to maintain electrical communication. Forming a hollow area in a peripheral area of the touch electrode layer includes: forming the hollow area in an area where the peripheral area overlaps with the organic insulating layer. The peripheral area, the hollow pattern and the overlapping area relating to the touch electrode layer have been described in detail above and thus are not repeated any more herein.

As another example, Step 504 may include the following substeps: first, a touch electrode layer (such as an ITO layer) may be formed on a substrate on which an organic insulating layer (for example, an OC layer or a BM layer) is formed. The substep may be implemented utilizing any existing technology used for forming the ITO thin film, such as depositing, coating or sputtering. Subsequently, the formed touch electrode layer may be patterned to form the electrode pattern having the hollow pattern. For example, the electrode pattern having the hollow pattern is formed by coating photoresist, carrying out exposure with a mask, developing with developing solution, etching with etching liquid and peeling off the photoresist in sequence, wherein the used mask can allow the touch electrode layer to have the hollow pattern at least in the peripheral area and at least in an area where the peripheral area overlaps with the organic insulating layer.

In this way, the hollow pattern is formed, and thus the release of organic gases caused by high temperature in a process is realized by means of the hollow pattern allowing the organic insulating layer beneath to be partially exposed, thereby preventing product performance deterioration caused by peeling off of the touch electrode layer in the peripheral area and achieving the objective of improving yield rate on the basis of not increasing process difficulty. Moreover, since the hollow pattern allows the touch electrode layer to maintain electrical communication, the problem of gas release and the problem of electrical communication can be balanced.

It is to be noted that although the method for fabricating the touch screen according to the embodiments of the present disclosure is described in the background of the OGS capacitive touch screen hereinbefore, those skilled in the art can understand that the principle of the present disclosure also may be applied to methods for fabricating other types of touch screens needing to arrange the touch electrode layers on the organic insulating layers.

III. Touch Device

According to the description hereinbefore, the touch device including the touch screen according to the embodiments of the present disclosure can effectively prevent the touch electrode from peeling off, which is not repeated any more herein. The examples of the touch device include, but not limited to: mobile phones, tablet computers, personal digital assistants, notebook computers, and desktop computers, etc.

It is to be noted that the above are merely exemplary embodiments of the present disclosure but is not intended to limit the protection scope of the present disclosure, and the protection scope of the present disclosure is defined by the appended claims.

What is claimed is:

1. A touch screen comprising a substrate, a touch electrode layer positioned above the substrate, and an organic insulating layer including an organic material positioned beneath the touch electrode layer, the touch electrode layer including a peripheral portion in a peripheral area of the touch screen, wherein only the peripheral portion includes a hollow area having a hollow pattern, wherein the hollow area is arranged in at least an area where the peripheral area overlaps with the organic insulating layer, and wherein the hollow pattern is configured to allow the organic insulating layer to be partially exposed and the touch electrode layer to maintain electrical communication.

2. The touch screen according to claim 1, wherein:
the hollow pattern comprises a plurality of mutually spaced strips;
a portion of the plurality of mutually spaced strips extend in a transversely electrically communicated area of the touch electrode layer; and
another portion of the plurality of mutually spaced strips extend in a longitudinally electrically communicated area of the touch electrode layer.

3. The touch screen according to claim 1, wherein the hollow pattern comprises a mesh pattern or a dense hole pattern.

4. The touch screen according to claim 1, wherein the organic insulating layer comprises an over coat layer.

5. The touch screen according to claim 4, wherein the organic insulating layer further comprises a black matrix layer positioned on a periphery of the substrate and beneath the over coat layer.

6. The touch screen according to claim 1, wherein the touch screen is a One Glass Solution (OGS) touch screen.

7. A touch device comprising the touch screen according to claim 1.

8. The touch device according to claim 7, wherein
the hollow pattern comprises a plurality of mutually spaced strips;
a portion of the plurality of mutually spaced strips extend in a transversely electrically communicated area of the touch electrode layer; and
another portion of the plurality of mutually spaced strips extend in a longitudinally electrically communicated area of the touch electrode layer.

9. The touch device according to claim 7, wherein the hollow pattern comprises a mesh pattern or a dense hole pattern.

10. The touch device according to claim 7, wherein the organic insulating layer comprises an over coat layer.

11. The touch device according to claim 10, wherein the organic insulating layer further comprises a black matrix layer positioned on a periphery of the substrate and beneath the over coat layer.

12. The touch device according to claim 7, wherein the touch screen is a One Glass Solution (OGS) touch screen.

13. A method for fabricating a touch screen, the method comprising:
forming an organic insulating layer including an organic material above a substrate; and
forming a touch electrode layer above the organic insulating layer, the touch electrode layer including a peripheral portion in a peripheral area of the touch screen;

wherein forming the touch electrode layer comprises forming a hollow area having a hollow pattern only in the peripheral portion, wherein the hollow pattern is configured to allow the organic insulating layer to be partially exposed and the touch electrode layer to maintain electrical communication, and wherein forming the hollow area comprises forming the hollow area in at least an area where the peripheral area overlaps with the organic insulating layer.

14. The method according to claim 13, wherein forming the hollow area having the hollow pattern comprises:
   forming a first plurality of mutually spaced strips extending in a transversely electrically communicated area of the touch electrode layer; and
   forming a second plurality of mutually spaced strips extending in a longitudinally electrically communicated area of the touch electrode layer.

15. The method according to claim 13, wherein forming the hollow area having the hollow pattern comprises] forming the hollow area having a mesh pattern or a dense hole pattern.

16. The method according to claim 13, wherein forming the organic insulating layer comprises forming a black matrix layer on a periphery of the substrate.

17. The method according to claim 16, wherein forming the organic insulating layer further comprises forming an over coat layer above the black matrix layer.

* * * * *